United States Patent [19]

Malone

[11] 4,249,065
[45] Feb. 3, 1981

[54] BIRD CAGE HEATER

[76] Inventor: James F. Malone, 5429 N. Lawrence St., Phila., Pa. 19120

[21] Appl. No.: 861,897

[22] Filed: Dec. 19, 1977

[51] Int. Cl.³ .................. H05B 1/02; H05B 3/02; A01K 45/00
[52] U.S. Cl. ..................... 219/220; 119/22; 119/26; 119/33; 128/396; 219/342; 219/346; 219/347; 219/358; 362/92; 362/127; 362/396
[58] Field of Search ............ 219/200, 201, 220, 280, 219/342, 552, 347, 352, 520; 119/26, 33, 1, 22, 31; 128/395, 396; 362/127, 130, 396, 806, 92

[56] References Cited

U.S. PATENT DOCUMENTS

| | | | |
|---|---|---|---|
| 730,750 | 6/1903 | Dowsing | 219/342 X |
| 1,061,225 | 5/1913 | Cunningham | 128/396 |
| 1,436,060 | 11/1922 | Strong | 219/347 |
| 1,561,317 | 11/1925 | Eshelman | 219/352 X |
| 1,651,385 | 12/1927 | Goodrich | 219/347 X |
| 1,840,261 | 1/1932 | Sideman | 219/522 X |
| 2,067,102 | 1/1937 | Simon | 219/342 |
| 2,127,604 | 8/1923 | Kothe | 128/396 |
| 2,209,801 | 7/1940 | Valverde | 219/552 X |
| 2,280,779 | 4/1942 | Barragy | 119/33 |
| 2,309,720 | 2/1943 | Washburn | 119/33 |
| 2,515,659 | 7/1950 | Michal | 219/354 X |
| 2,521,480 | 9/1950 | Roberts | 219/552 X |
| 2,610,285 | 9/1952 | Rusnak et al. | 219/358 X |
| 2,626,340 | 1/1953 | Huck | 219/517 |
| 2,722,596 | 11/1955 | Brouet | 219/552 X |
| 2,745,940 | 5/1956 | Stroh | 219/358 X |
| 2,756,720 | 7/1956 | Richmond et al. | 119/26 |
| 2,839,660 | 6/1958 | Davies | 219/523 X |
| 3,646,319 | 2/1972 | Auld | 219/354 X |

*Primary Examiner*—A. Bartis
*Attorney, Agent, or Firm*—Steele, Gould and Fried

[57] ABSTRACT

A bird cage heater includes a housing divided by a partition into an upper lamp compartment and a closed lower control compartment. The upper compartment has reflective internal walls and an open front. An electric light bulb is mounted in the upper compartment. Fastening devices are provided for detachably mounting the housing entirely on the exterior of bird cage with the open front wall facing the interior of the cage so that heat and light produced by the light bulb are reflected through the open front wall into the cage. A thermostat responsive to the temperature of the lower closed compartment controls energization of the light bulb. An indicator lamp is provided to provide indication of the operability of the light bulb filament. A colored light bulb may be used thereby providing a decorative effect in addition to heat.

4 Claims, 1 Drawing Figure

U.S. Patent      Feb. 3, 1981      4,249,065
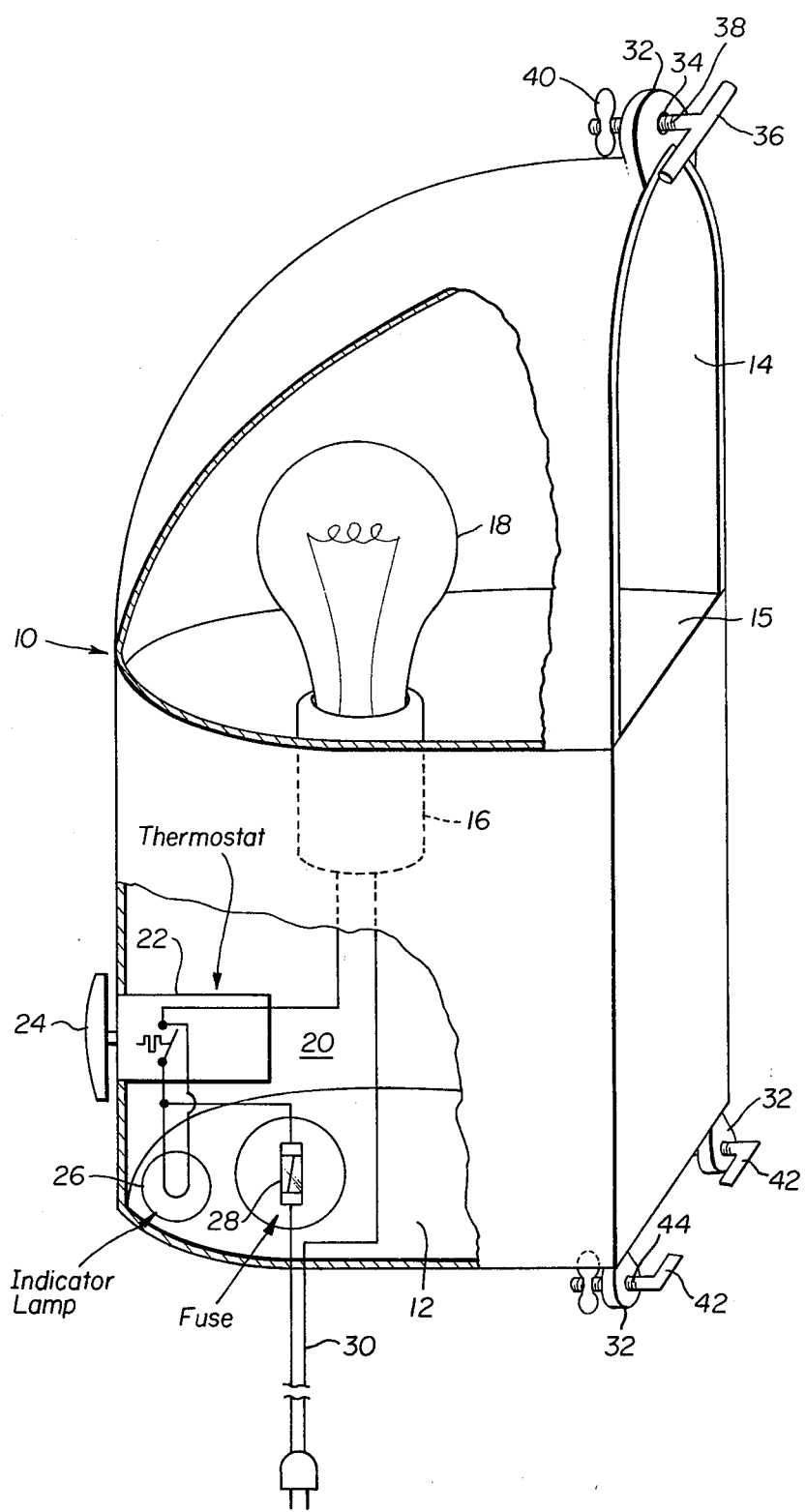

BIRD CAGE HEATER

BACKGROUND OF THE INVENTION

1. Field of the Invention

This invention relates to heating and lighting apparatus for pets in general, and in particular, to an apparatus for heating bird cages and for simultaneously supplying a decorative effect.

2. Prior Art

Bird cage heaters known in the art require that at least some significant part of the heating apparatus be disposed inside the cage. In some instances, an apparatus provides a perch over a heating means, all of which is disposed entirely within the bird cage. In another instance, heating means is provided for heating a perch, with only the perch projecting inside the bird cage.

External heaters are known with respect to incubators and oother closed pet structures, but the enclosed nature of these devices makes the retention of heat a much simpler problem than that of an open bird cage.

The difficulties known in the prior art of providing a heating apparatus for a bird cage which need not be disposed therein, are overcome in the present invention by an apparatus comprising a heat and light reflective housing, having means for detachably mounting the housing to the cage, means for heating and lighting the cage disposed in the housing, and electrical circuit means for supplying energy to the heating and lighting means, including a thermostat for controlling the temperature of the apparatus. By utilizing colored light bulbs as the heating and lighting means, this invention also provides a striking decorative effect, by bathing the bird cage in the particular chosen color. Such a combination of features is not taught in the prior art.

SUMMARY OF THE INVENTION

It is an object of this invention to provide an improved apparatus for heating bird cages or the like.

It is another object of this invention to provide an improved means for heating bird cages or the like, which may be detachably connected to the outside of the bird cage.

It is a further object of this invention to provide an improved means for heating a bird cage or the like, which has no operative elements disposed within the bird cage.

It is still another object of this invention to provide an improved means for heating a bird cage or the like, which simultaneously provides a striking decorative effect.

These and other objects of this invention are accomplished by an apparatus comprising a heat and light reflective housing, having means for detachably mounting the housing to a bird cage, means for heating and lighting the cage disposed in the housing, and electrical circuit means for supplying energy to the heating means, including a thermostat for controlling the temperature of the apparatus. The heating and lighting means may be a light bulb, and if so, may be a colored light bulb. In this instance, the bulb provides not only heat, but a striking decorative effect, by bathing the bird cage, and all of the birds therein, in the color of the light chosen.

BRIEF DESCRIPTION OF THE DRAWINGS

An illustrative embodiment of this invention is shown in the accompanying FIGURE, a partial sectional view of a heating apparatus according to this invention, it being understood that this invention is not limited to the precise arrangements and instrumentalities shown.

DETAILED DESCRIPTION OF THE PREFERRED EMBODIMENT

The presently preferred embodiment of this invention is illustrated in the drawing. A hollow elongated housing 10 is divided by a partition 15 into an upper lamp compartment 14, having an open front wall, and a lower closed control compartment 12. The upper lamp compartment has inner reflective walls to direct heat and light through the open front wall thereof and into a bird cage on which the housing can be mounted. Heating and lighting means 18, a colored light bulb in the presently preferred embodiment, is disposed in mounting means 16, a conventional light bulb socket. The heating and lighting means 18 is controlled by electrical circuit means 20. Electrical circuit means 20 in the lower control compartment comprises adjustable thermostat 22 responsive to the temperature in the lower control compartment, neon lamp indicator 26, and fuse 28. Thermostat 22 is provided with control dial 24, and the condition of the filament in the bulb, that is, not "burned out", is indicated by the neon lamp indicator 26. Fuse 28 provides overload protection.

The electrical circuit means 20 is illustrated schematically in the Figure. One wire of plug and power cord 30 is connected to one contact of light bulb socket 16, and the other wire of plug and power cord 30 is connected to one end of fuse 28. The other end of fuse 28 is connected to one terminal of neon lamp indicator 26, and to one terminal of thermostat 22. The other terminal of thermostat 22 is connected to the remaining terminal of light bulb socket 16 and the other terminal of neon lamp indicator 26. In other words, the light bulb 18, thermostat 22 and fuse 28 are connected in series, and the neon lamp indicator 26 is connected in parallel with the thermostat. When heating and lighting means 18 is a light bulb, it is merely screwed into socket 16 in the conventional fashion. Thermostat 22 is controlled by dial 24. If the filament of light bulb 18 is not burned out, indicator lamp 26 will be "shorted out" when the switch of thermostat 22 is closed, but bulb 18 will light. When the switch of thermostat 22 is open, and the filament of light bulb 18 is intact, indicator lamp 26 will be lit, although light bulb 18 will not be lit, due to the high resistance of indicator lamp 26 being in series with the filament of light bulb 18. If the filament of light bulb 18 is burned out, neither light bulb 18 nor indicator lamp 26 will be lit, thereby giving positive indication of the condition of the filament of light bulb 18. The fuse 28 provides overload protection.

With reference once again to the FIGURE, the housing 10 may be conveniently and detachably secured to a bird cage or the like by the illustrated fastening means. Three mounting tabs 32, are formed integrally with or permanently secured to the housing, with one tab being secured to the top of heat and light reflective hood 14 and two tabs being secured to the bottom corners of lower section 12. The mounting tabs 32 are provided with holes 34. With reference to the upper mounting tabs 32, a T-shaped fastener 36, having a threaded shank section 38 is disposed through hole 34, and retained by hand-tightenable wing nut 40. The mounting tabs of the lower section 12 are each provided with L-shaped fastener 42, having threaded shank section 44, disposed through hole 34. The L-shaped fasteners 42 are also retained by hand-tightenable wing nuts 40.

It may be appreciated that unlike heating apparatus in the prior art, the bird or other pet protected by the heating apparatus of this invention need not be located in a very limited area in order to benefit from the heating apparatus. The heat and light reflective hood 14 provides warmth over a larger volume of the cage.

In today's world, energy conservation is of utmost importance. Thermostats in homes or the like are generally kept at lower levels than has previously been the practice, and at night, these levels are often even lower. Human beings may adapt to these conditions by wearing warmer clothes or by using additional blankets. Pets, on the other hand, are at a distinct disadvantage. Even among pets, animals such as birds are at a further disadvantage. This invention provides a safe and inexpensive means for protecting pets such as birds from the cold, notwithstanding the generally lower temperatures or drafty conditions necessitated by today's energy conservation programs. In addition to providing this protection, this invention also provides a very striking decorative effect, by bathing the pet and cage in the color or light chosen by the owner. Since the heating and lighting means is very simple to change, in the presently preferred embodiment necessitating only replacement of a light bulb, this decorative effect can be changed frequently without inconvenience.

The present invention may be embodied in other specific forms without departing from the spirit or essential attributes thereof, and accordingly, reference should be made to the appended claims, rather than to the foregoing specification as indicating the scope of the invention.

I claim:

1. Apparatus for heating birds in bird cages or the like, comprising:

a heat and light reflective housing, said housing comprising a hollow elongated structure divided by a partition into an upper lamp compartment and a closed lower control compartment;

the upper compartment having a light bulb mounted therein for producing heat and light, and having reflective internal walls and an open front wall through which the heat and light can exit from the upper compartment;

the housing further having fastening devices for detachably mounting the housing entirely on the exterior of a bird cage with the open front wall of the upper compartment facing the interior of the cage so that the heat and light produced by the light bulb can be reflected through the open front wall of the upper compartment into the cage when the housing is mounted on the cage; and, electrical circuit means, disposed in the lower control compartment, for supplying energy to the light bulb, including a thermostat arranged to energize and de-energize the light bulb in accordance with the temperature in the lower control compartment.

2. The apparatus of claim 1, wherein said light bulb is a color other than white, thereby providing a decorative effect in addition to the heat.

3. The apparatus of claim 1, wherein said electrical circuit means further comprises:

a fuse in series with the light bulb for protecting the circuit against overload; and, a neon indicator lamp connected in circuit with the thermostat and light bulb to provide indication of the operability of the light bulb filament.

4. The apparatus of claim 3, wherein said light bulb, thermostat and fuse are connected in series, and said neon indicator lamp is connected in parallel with said thermostat.

* * * * *

UNITED STATES PATENT AND TRADEMARK OFFICE
CERTIFICATE OF CORRECTION

PATENT NO. : 4,249,065
DATED : February 3, 1981
INVENTOR(S) : JAMES F. MALONE

It is certified that error appears in the above-identified patent and that said Letters Patent are hereby corrected as shown below:

On the title page, left column, lines 2-3, the inventor's address should be --805 Brighton Street, Philadelphia, PA 19111--, rather than "5429 North Lawrence Street, Phila., PA 19120".

On the title page, in the Abstract at line 7, after "of" should be --the--.

In the Specification at column 1, line 19, "oother" should be --other--.

Signed and Sealed this

Twenty-ninth Day of September 1981

[SEAL]

Attest:

Attesting Officer

GERALD J. MOSSINGHOFF

Commissioner of Patents and Trademarks